United States Patent [19]

Grenadier

[11] Patent Number: 4,502,724
[45] Date of Patent: Mar. 5, 1985

[54] VEHICLE PAYLOAD LIGHTENER

[76] Inventor: R. Miles Grenadier, Box 731, Lenox, Mass. 01240

[21] Appl. No.: 197,508

[22] Filed: Oct. 16, 1980

[51] Int. Cl.³ .............................................. B62D 35/00
[52] U.S. Cl. ...................................... 296/1 S; 244/10; 105/2 A
[58] Field of Search .......................... 296/1 S; 244/10; 105/2 R, 2 A

[56] References Cited

U.S. PATENT DOCUMENTS

| | | | |
|---|---|---|---|
| Re. 18,122 | 7/1931 | Flettner | 244/10 |
| 2,569,983 | 10/1951 | Favre | 244/10 |
| 4,113,299 | 9/1978 | Johnson et al. | 296/1 S |

Primary Examiner—Robert R. Song
Attorney, Agent, or Firm—Cushman, Darby & Cushman

[57] ABSTRACT

The exterior of a vehicle, e.g. the roof of a land vehicle such as a tractor trailer cab, trailer, truck, bus, auto, van, rail car or the like, is provided with exposed moving surface, which moves relatively rearwardly, relatively more quickly than the vehicle progresses. As a result the vehicle may be made to bear more lightly on the ground, so that more weight may be transported. In a preferred embodiment the moving surface is constituted by the exposed upper run of an endless band entrained about fore and aft rollers provided with a driving mechanism e.g. for rotating at least one of the rollers. The lower run of the band may be hidden. Controls are described.

15 Claims, 5 Drawing Figures

FIG. 4
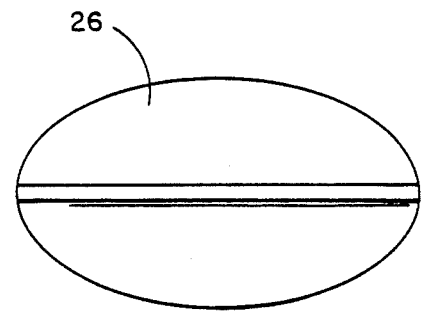
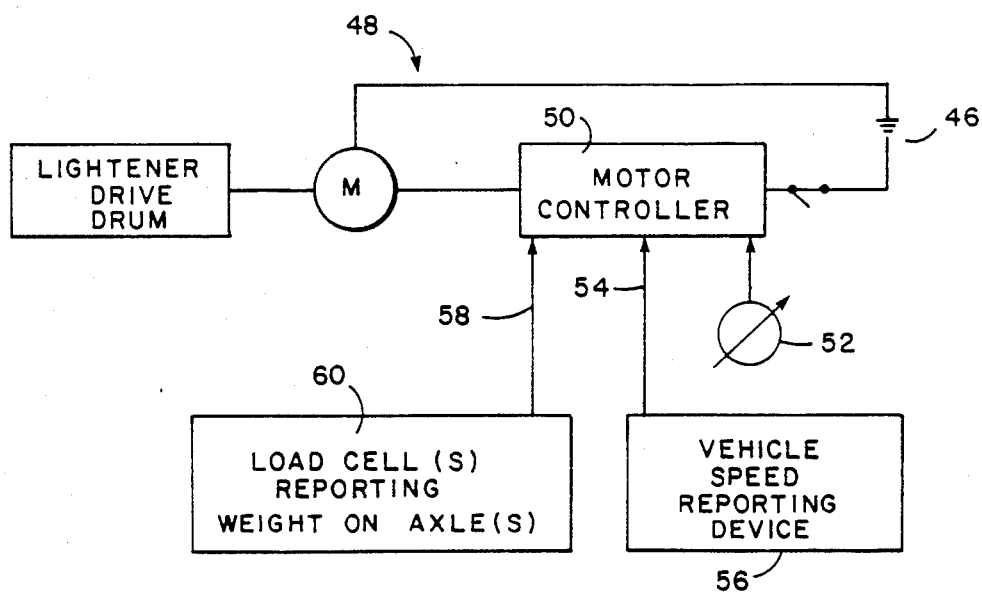
FIG. 5

VEHICLE PAYLOAD LIGHTENER

BACKGROUND OF THE INVENTION

According to the current *Encyclopedia Britannica* (1974 Edition), under the entry "Sails and Sailing Ships", > In 1924 a wholly new kind of sailing vessel, the rotor ship, was extensively tested. Its German inventor, Anton Flettner, based his idea on the discovery that the wind pressure on a revolving cylinder was considerably greater than on a conventional sail. Flettner began by installing in a small freighter two cylinders 50 feet (15 meters) high, which were spun by an electric motor. Steering by controlling the spinning of the rotors, he reached a speed of nine and a half knots. He made further tests with three cylinders 60 feet (18 meters) high in a larger ship but found he could obtain satisfatory results only when all conditions were favourable. The idea was not pursued, and there seems to have been no other invention using wind power in such a radical way.

In 1926, Flettner published his work in book form, and Albert Einstein, in his *Essays in Science*, devotes a full essay to "The Flettner Ship".

The basic Flettner sail invention is described in U.S. Pat. No. Re. 18,122, reissued July 7, 1931. Several U.S. patents issued before and since show windmills associated with vehicles, vehicles with rotatable or movable surfaces for achieving some surface effect benefit, and applications for the Flettner invention in sailing and other fields.

SUMMARY OF THE INVENTION

The exterior of a vehicle, e.g. the roof of a land vehicle such as a tractor trailer cab, trailer, truck, bus, auto, van, rail car, or the like, is provided with an exposed moving surface, which moves relatively rearwardly, relatively more quickly than the vehicle progresses. As a result the vehicle may be made to bear more lightly on the ground, so that more weight may be transported. In a preferred embodiment the moving surface is constituted by the exposed upper run of an endless band entrained about fore and aft rollers provided with a driving mechanism, e.g. for rotating at least one of the rollers. The lower run of the band may be hidden. Controls are described.

The principles of the invention will be further discussed with reference to the drawings wherein preferred embodiments are shown. The specifics illustrated in the drawings are intended to exemplify, rather than limit, aspects of the invention as defined in the claims.

BRIEF DESCRIPTION OF THE DRAWINGS

In the drawings

FIG. 4 is a larger scale fragmentary plan view of the region of the band shown circled in FIG. 3; and FIG. 5 is a schematic diagram of a typical control system for a vehicle equipped with a load lightener of the present invention.

DETAILED DESCRIPTION

Figure 1:
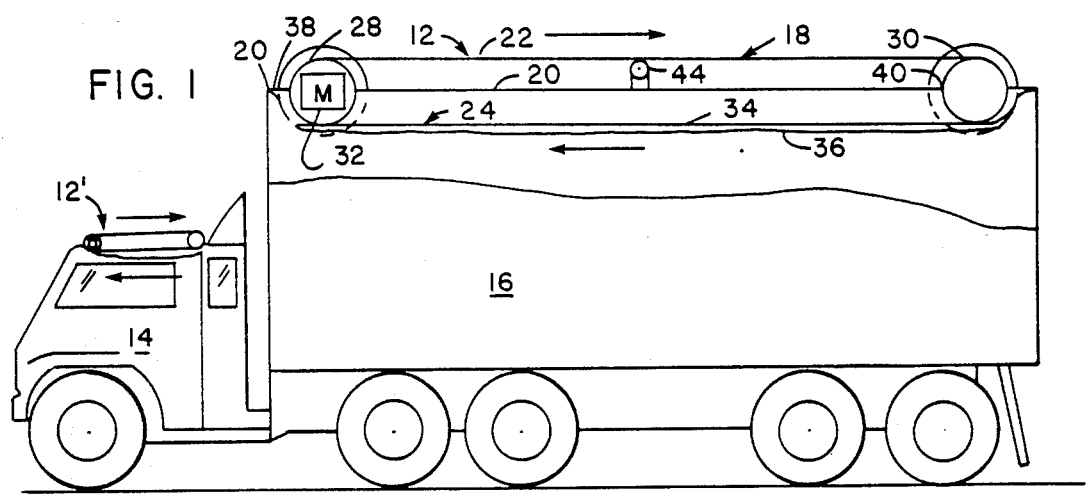
FIG. 1 is a schematic side elevational view, partly in longitudinal section, of a tractor trailer, wherein the cab and trailer are each provided with a vehicle lightener in accordance with principles of the present invention.
Figure 2:
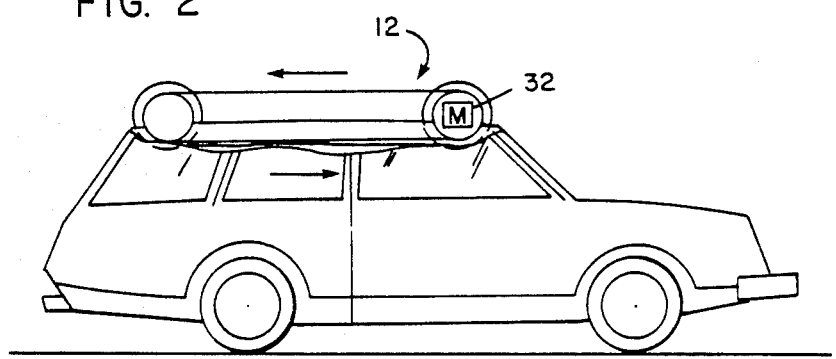
FIG. 2 is a similar schematic view of a station wagon provided with a vehicle lightener of the present invention.
Figure 3:
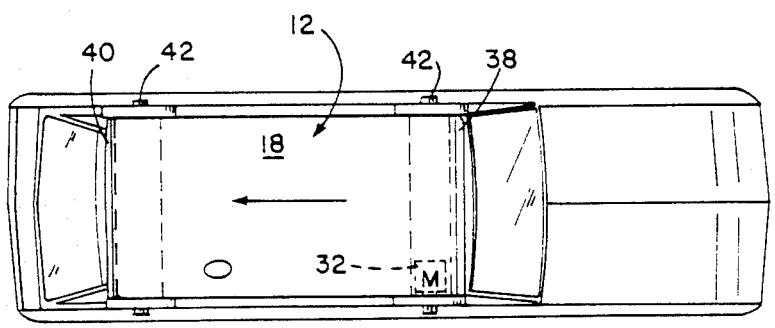
FIG. 3 is a top plan view thereof.

In FIG. 1 there is shown an otherwise conventional transport vehicle, e.g. a tractor trailer which has been fitted with two payload lightener systems 12, 12' according to the present invention, one on the cab 14 and the other on the trailer 16. Since both of these are substantially alike and either can be provided and used without or in addition to the other, only the one on the trailer will be described in detail. FIG. 2 shows the same invention but provided on a station wagon. The invention may be used on other road and off-road land vehicles, on rail vehicles such as train engines and cars, subway cars, monorail-mounted vehicles, and on waterborne vehicles such as speedboats, hydroplanes, and on ground effect vehicles such as hovercraft.

Basically, the payload lightener 12 is constituted by means providing an upwardly facing, broad and long moving surface 18, nearly as large in area as and superimposed upon the vehicle roof 20, but spaced upwardly therefrom at least slightly so as not to be in sliding contact therewith, and operable so as to have a substantial rearward net velocity relative to the vehicle while remaining in place upon the vehicle roof. The purpose, as with the Flettner sail, is to create a controllable amount of lift using the Bernoulli principle and the Magnus effect, so that less of the vehicle weight is pressed against the ground. Generally, the moving surface 18 will have a velocity substantially greater than the vehicle. For instance, the absolute velocity of the moving surface 18, i.e. relative to the land over which the vehicle is travelling, may advantageously be about 3.5 times the absolute velocity of the vehicle.

Conveniently, the moving surface 18 may be constituted by the upper surface of the upper run of an endless band 24 e.g. of conventional conveyor belting stock. Preferably the band 24 is made of woven nylon webbing very similar to that conventionally used as vehicle seat belt material, although other materials could be used. Preferably the band 24 is ribbed so as to have ribbing 26, as illustrated in FIG. 4. The endless band 24 is entrained about two transversally oriented, longitudinally spaced rolls 28, 30, one of which has a drive means 32 such as an electric motor M conveniently connected in driving relation thereto. The motor may be located along side one end of the respective roll, within the respective roll, or otherwise placed in driving relation with the endless band 24.

By preference, the lower run 34 of the belt 24 is isolated by being located under the vehicle roof 20, e.g. within the vehicle, although walled-off if need be by an inner drop ceiling or shell wall 36. In this case, two slots 38, 40 are provided in the vehicle roof at the drum location. Brackets 42 mount the drums 28, 30 to the vehicle within the slots 38, 40, so that the upper run emerges through the forward slot 38 and disappears through the rear slot 40. If the band 24 upper run 22 is long enough to need it, one or more intermediate support rolls 44 may be mounted on the vehicle to bear-up the upper run and keep it from dragging on or flapping against the vehicle roof intermediate the rolls 28, 30.

The electric motor M preferably is a 5000 r.p.m., 12-volt motor run off the vehicle electrical system, generally indicated at 46 in FIG. 5.

The system 48 preferably is provided with a manual cut-off switch, and a motor controller 50 is preferably provided. The controller 50 preferably includes means 52 such as a rheostat for permitting the vehicle operator to vary the motor M drive speed to decrease the motor r.p.m.'s from a designed-in safe maximum speed. The motor controller 50 also preferably includes an input 54 from a conventional vehicle speed sensing and indicating device 56, for automatically correspondingly speeding-up the motor M drive speed as the vehicle travelling speed increases, e.g. to maintain the aforesaid desired speed ratio of e.g. 3.5:1. Of course, this portion of the controller may have a limiter, so that should the vehicle exceed a predetermined speed, e.g. 55 miles per hour, the belt upper run would not be driven rearwards at any faster speed than it had when the vehicle was travelling at the predetermined speed. This same limiter is used for dynamically braking the motor as the vehicle slows down.

Also preferably provided as part of the controller is a means 58 for accepting the output of one or more load cells 60 or the like, each of which conventionally reports the weight on a respective axle, and for automatically limiting the maximum belt drive speed provided by the motor M, so that the weight on any axle does not become dangerously light.

Controllers having the ability to accept the aforesaid inputs and provide the aforesaid outputs are well within the skill of the motor controller art and thus need not be described in further detail here.

The rolls 28, 30 may be flanged-end metal e.g. aluminum drums mounted on drive axles, where friction between the inner face of the endless band and the drive drum exterior provides the necessary driving relation. This contact may be enhanced by ribbing on the belt and corresponding corrugations on the drive drum. Or the belt and drive drum or drive drum flanges may be provided with drive chains and sprocket teeth, respectively, in meshing relation. Or motive power may be transferred from the drive means 32 to the moving surface means 18 in any other convenient way. If the endless belt and/or rolls 28, 30 are constructed in such a way that flanges are not needed at the roll ends to keep the belt laterally in place the rolls 28, 30 or either of them may be flangeless. In that case, for instance, the respective roll may be constituted by a body of foam plastic, e.g. polystyrene, molded onto a metal drive shaft.

Suitable drains (not shown in detail) are provided from the region under the roof slots to prevent the build-up of rainwater. Various accessories may also be provided as needed, such as shrouding for safety purposes, covers for when the device is not in use, e.g. to keep out ice, snow, sand, leaves and the like, heaters/defrosters for making the device useful when the vehicle has been parked outside in wet, freezing weather, indicating and warning lights and other means for indicating that the band is operating at an acceptable, desired or unacceptable speed, or is improperly tensioned, has become too worn or is otherwise in need of care, refurbishing or replacement.

The device of the invention may be retrofitted to existing vehicles, or built-into new vehicles. Rather than requiring slots to be cut into the existing vehicle roof, the whole device may be separately provided with its own "roof" and this whole device merely bolted, welded, clamped or otherwisse secured upon the vehicle so as to deploy the moving surface means as the effective upper surface of the vehicle.

Frontal and/or rearwardly presented surfaces of vehicles may be similarly provided with devices of the present invention with the moving surface means generally paralleling the vehicle surface it overlies. Provided it is done coordinately, left and right side surface of a vehicle may also likewise be overlaid with rearward-running moving surface means of the present invention.

While the movable surface preferably covers as much as possible of the vehicle upper side, it may be substantially shorter or narrower or may be provided in plurality in a laterally or longitudinally extending series of two or more similar moving surface means. The moving surface means may be slowed-down from or speeded-up to a preselected maximum speed, and may be turned-off when considered unneeded or not desired. Preferably, the endless belt of the moving surface means is made to last as long as possible; this is why the use of conveyor belting material, which has already proven itself in extended service is preferred.

The term "ground" as used herein is intended to be generic to land or water, frozen or liquid.

It should now be apparent that the vehicle payload lightener as described hereinabove, posssess each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

What is claimed is:

1. A method for decreasing the apparent payload carried by a transport vehicle which has an outwardly presented external portion, comprising:
   superimposing upon said vehicle external portion a movable surface in spaced relation thereto, said movable surface being provided as the external side of the upper run of substantial length, of an endless band entrained about two cylinders; and
   while said vehicle is advancing along a path, moving said surface rearwardly at a substantially greater velocity than said vehicle is advancing forwardly, while maintaining said superimposition;
   sensing the speed at which said vehicle is advancing along said path, and
   at least up to a preselected maximum, automatically, moving said movable surface in proportion to said sensed speed of vehicle advance according to a manaully variable ratio having a preselected maximum.

2. The method of claim 1, wherein:
   said external portion and said movable surface face upwardly.

3. The method of claim 2, wherein:
   said external portion is a vehicle roof and said superimposition causes said roof to be substantially fully covered by said moving surface.

4. The method of claim 1, wherein:
   said movable surface being caused to move by power-rotating one of said cylinders in driving relation to said band.

5. The method of claim 1, wherein:
   the vehicle is normally pressed by the weight of at least a portion thereof against the ground;

and wherein the sensing step is conducted by sensing the weight of said portion of the vehicle upon the ground while the vehicle is travelling along said path.

6. Apparatus for decreasing the apparent payload carried by a transport vehicle which has an outwardly presented external portion, comprising:

a movable surface superimposed upon said vehicle external portion in said relation thereto;

an endless band entrained about two transversally oriented, substantially longitudinally spaced rolls, said movable surface being constituted by the outer surface of the upper run of said band; and said moving means comprising means for running the band on said rolls; and means for moving said surface rearwardly at a substantially greater velocity than said vehicle is advancing forwardly while maintaining said superimposition by support means arranged for mounting on said vehicle;

said moving means comprising an electric motor having a speed control;

said speed control being adapted to be automatically operated to, at least up to said preselected maximum vehicle speed, automatically move said movable surface in proportion to a sensed speed of vehicle advance according to a manually variable ratio having a preselected maximum.

7. The apparatus of claim 6, wherein:
said support means dispose said movable surface so as to face upwardly.

8. The apparatus of claim 7, wherein:
said support means includes a vehicle roof and said movable surface substantially fully covers said vehicle roof.

9. The apparatus of claim 6, wherein:
said running means is constituted by means for power-rotating at least one of said rolls, said roll being in driving relation with said endless band.

10. The apparatus of claim 6, wherein:
said support means dispose said movable surface so as to face upwardly;

said support means includes a vehicle roof and said movable surface substantially fully covers said vehicle roof.

11. The apparatus of claim 10, further comprising:
wall means isolating the lower run of said band from said outer surface of said upper run of said band.

12. The apparatus of claim 11, wherein:
said wall means includes a panel of said roof, said roof having means defining two slots therein, and said rolls being partially recessed in said slots, so that said lower run of said band returns forwardly under said roof panel.

13. The apparatus of claim 12, wherein:
said roof panel is integral with the vehicle.

14. The apparatus of claim 12, wherein:
said roof panel is adapted to be secured to said roof for retrofitting the vehicle.

15. Apparatus for decreasing the apparent payload carried by a transport vehicle which has an outwardly presented external portion, comprising:

a movable surface superimposed upon said vehicle external portion in said relation thereto;

an endless band entrained about two transversally oriented, substantially longitudinally spaced rolls, said movable surface being constituted by the outer surface of the upper run of said band; and said moving means comprising means for running the band on said rolls; and means for moving said surface rearwardly at a substantially greater velocity than said vehicle is advancing forwardly while maintaining said superimposition by support means arranged for mounting on said vehicle;

said moving means comprising an electric motor having a speed control;

said speed control being adapted to be automatically operated to, at least down to a preselected minimum sensed weight of a portion of the vehicle upon the ground, automatically move said movable surface fast enough to substantially lower the effective weight of said portion of the vehicle upon the ground in comparison to what it would be were said movable surface not moved so rapidly relative to said vehicle.

* * * * *